United States Patent [19]

Imai et al.

[11] 4,396,855
[45] Aug. 2, 1983

[54] PLASMA JET IGNITION PLUG WITH CAVITY IN INSULATOR DISCHARGE END

[75] Inventors: Iwao Imai, Yokosuka; Masazumi Sone, Yokohama, both of Japan

[73] Assignee: Nissan Motor Co., Ltd., Yokohama, Japan

[21] Appl. No.: 158,910

[22] Filed: Jun. 12, 1980

[30] Foreign Application Priority Data

Jun. 18, 1979 [JP] Japan .................................. 54-77020
Aug. 2, 1979 [JP] Japan .................................. 54-98874
Aug. 3, 1979 [JP] Japan .................................. 54-99227

[51] Int. Cl.³ .......................................... H01T 13/20
[52] U.S. Cl. .................................... 313/139; 313/141; 313/143
[58] Field of Search ........................ 313/139, 141, 143

[56] References Cited

U.S. PATENT DOCUMENTS 3,892,991 7/1975 Joslyn .............................. 313/143 X

FOREIGN PATENT DOCUMENTS

| 405342 | 5/1922 | Fed. Rep. of Germany . |
| 7143512 | 11/1971 | Fed. Rep. of Germany . |
| 2256177 | 11/1972 | Fed. Rep. of Germany . |
| 2460378 | 6/1976 | Fed. Rep. of Germany . |
| 7719093 | 6/1977 | Fed. Rep. of Germany . |
| 991827 | 6/1951 | France . |
| 2206798 | 6/1974 | France . |
| 2295592 | 7/1976 | France . |
| 377935 | 8/1932 | United Kingdom . |
| 526347 | 9/1940 | United Kingdom . |
| 765264 | 1/1957 | United Kingdom . |
| 1131042 | 10/1968 | United Kingdom . |
| 1310499 | 3/1973 | United Kingdom . |
| 1410471 | 10/1975 | United Kingdom . |

OTHER PUBLICATIONS

"Materials & Techniques for Electron Tubes", by W. H. Kohl; Chapter 7, Table 7.1, p. 218, Table 7.4, p. 228; 1962.

*Primary Examiner*—Palmer C. Demeo
*Attorney, Agent, or Firm*—Lane, Aitken & Kananen

[57] ABSTRACT

A plasma jet ignition plug comprises an electric insulator formed with a discharge cavity and a plurality of electrodes communicating with the discharge cavity to form, within the discharge cavity, a spark gap. The plurality of electrodes include a central electrode connected to a high voltage electric source and a low voltage electric source, and a peripheral electrode which is grounded. The peripheral electrode substantially closes the discharge cavity and is formed with a jet opening. At least that part of at least one of the plurality of electrodes which communicates with the discharge cavity is made of a material selected from a group consisting of ferrite, a nickel alloy containing at least one of silicon, aluminum and magnesium, and electrically conductive ceramic.

2 Claims, 19 Drawing Figures

|     |                              | DISCHARGE VOLTAGE (KV) |
|-----|------------------------------|------------------------|
| (1) | PLUG IN FIG. 1               | 12 ~ 15                |
| (2) | PLUG IN FIG. 4               | 8 ~ 9                  |
| (3) | PLUG WITH THIRD ELECTRODE    | 10 ~ 12                |
| (4) | PLUG IN FIG. 8(A)            | 6 ~ 7                  |

FIG. 9
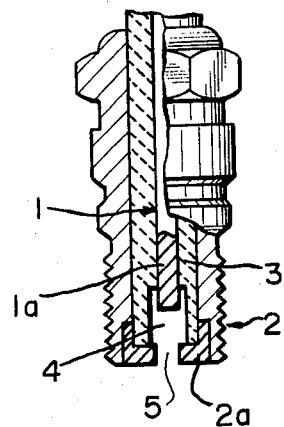
FIG. 9(A)
FIG. 9(B)
FIG. 10
(A) (B) (C)
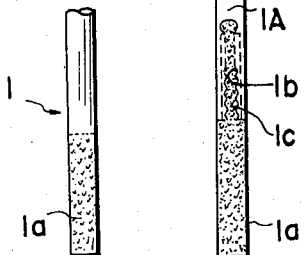
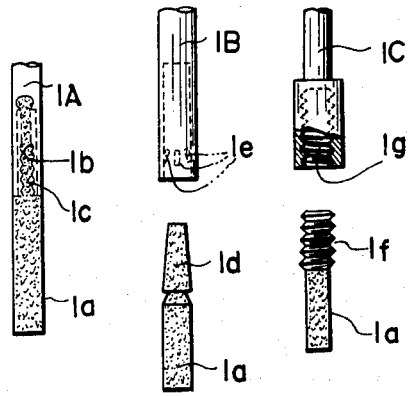
FIG. 11
(A) (B)
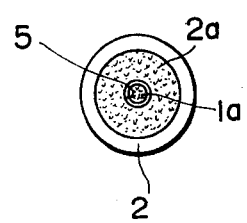
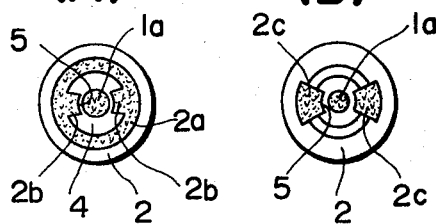

PLASMA JET IGNITION PLUG WITH CAVITY IN INSULATOR DISCHARGE END

BACKGROUND OF THE INVENTION

The present invention relates to a plasma jet ignition plug for a plasma jet ignition system, and more particularly to a plasma jet ignition plug which is so constructed as to suppress noise caused by discharge pulses.

In the spark ignition internal combustion engines, it is necessary that the ignition is assured even in a lean air fuel mixture range and, in this respect, there have been made various kinds of improvements in ignition plugs which are considered to directly affect the ignitability.

In order to enhance the ignitability of the spark ignition internal combustion engine, there has been proposed a plasma jet ignition system which uses a plurality of so-called plasma jet ignition plugs.

Known plasma jet ignition plugs have a problem that electromagnetic wave noise occurring upon spark discharge is so strong that it disturbs television broadcasting service, radio broadcasting service and other kinds of radio communication systems. Besides, the generation of the noise causes operational errors in electronically controlled circuits used as vehicle control systems, such as, an electronically controlled fuel injection system or an electrically controlled skid control system, and as a result, traffic safety will be threatened.

SUMMARY OF THE INVENTION

According to the invention, there is provided a plasma jet ignition plug which comprises an electric insulator formed with a discharge cavity and a plurality of electrodes communicating with the discharge cavity to form, within the discharge cavity, a spark gap, the plurality of electrodes including a central electrode connected to a high voltage electric source circuit and a low voltage electric source circuit and a peripheral electrode connected to the ground, the peripheral electrode substantially closing the discharge cavity and formed with a jet opening, wherein at least one of said plurality of electrodes which communicates with the discharge cavity includes a portion made of a material selected from a group consisting of ferrite, a nickel alloy containing at least one of silicon, aluminum and magnesium, and electrically conductive ceramic.

Where the nickel alloy contains silicon, silicon content is 3 to 7%; where the nickel alloy contains aluminum, content is 2 to 10%; and where the nickel alloy contains magnesium, magnesium content is 1 to 15%.

Where electrically conductive ceramic is used, a tip of an electrode is prevented from melting by the heat of the plasma gas and wearing at a fast rate, thus allowing a prolonged use of a plasma jet ignition plug. The reason is that electrically conductive material is heat resistive.

Where it is required to prolong the life of an electrode, at least that part of the electrode which communicates with the discharge cavity should be made of a heat-resistive material, e.g., electrically conductive ceramic, electrically conductive cermet, tungsten, tungsten alloy, so as to prevent the electrode from melting by the heat of the plasma jet gas and from wearing at a fast rate.

An object of the present invention is to provide a plasma jet ignition plug which has suppressed or reduced the generation of electromagnetic noise to an acceptable low level.

BRIEF DESCRIPTION OF THE DRAWINGS

The features and advantages of the plasma jet ignition plug according to the present invention will be more clearly appreciated from the following description taken in conjunction with the accompanying drawings in which like reference numerals designate corresponding elements, and in which:

FIG. 9 is a fragmentary side view partly broken away illustrating a fifth embodiment of a plasma jet ignition plug;

FIG. 9(A) is a side view of the central electrode used in FIG. 9;

FIG. 9(B) is a bottom view of the embodiment of FIG. 9;

FIGS. 10(A) to (C) are side views illustrating modifications of a central electrode; and FIGS. 11(A) and (B) are similar views to FIG. 9(B) illustrating modifications of a peripheral electrode.

DETAILED DESCRIPTION OF THE INVENTION

Figure 1:
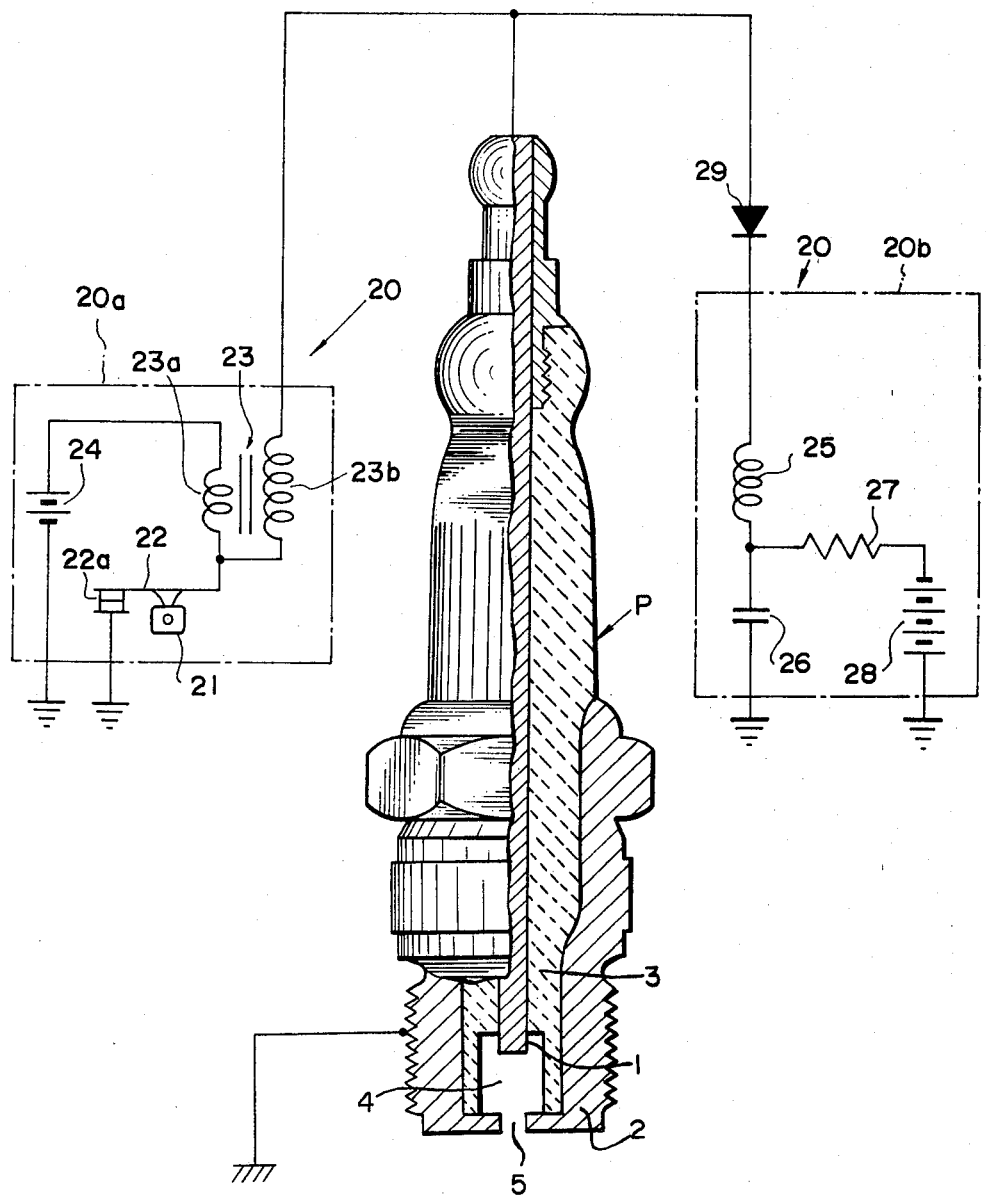
FIG. 1 is a side view, partly in section, of a plasma jet ignition plug associated with an electric source circuit.

To facilitate understanding of the present invention, a reference is made to a conventional plasma jet ignition plug depicted in FIG. 1. Referring to FIG. 1, the plasma jet ignition plug P is provided with a plurality of electrodes including a central electrode 1 and a peripheral electrode 2. An electric insulator 3 is formed with a discharge cavity 4. The central electrode 1 and peripheral electrode 2 communicate with the discharge cavity 4 and form, within the discharge cavity 4, a spark gap. It will be noted that the spark gap is surrounded by the insulator 3. The insulator 3 is made of ceramic. The peripheral electrode 2 substantially closes the discharge cavity 4 and is formed with a jet opening 5 via which plasma gas generated within the discharge cavity 4 is ejected to the air fuel mixture outside of the discharge cavity 4.

The central electrode 1 is made of a nickel alloy containing, as an additive, a very little amount of manganese or barium or iron. These additives are effective in decreasing damage by heat of a plasma jet gas, by high temperature oxidation and by chemical corrosion.

In operation, a spark is produced between the central electrode 1 and the peripheral electrode 2 to cause the generation of high temperature, high energy plasma gas in the discharge cavity 4, a pressure increase in the discharge cavity 4 as a result of a thermal expansion of the plasma gas causes a portion of the plasma gas to be ejected via said jet opening 5 into the air fuel mixture outside of the discharge cavity 4 in the form of a jet of high temperature, high energy gas, forming many spot-like flames in the air fuel mixture, assuring safe ignition of the mixture.

Connected to the central electrode 1 of the plasma jet ignition plug P is an electric source circuit 20. This electric source circuit 20 comprises a high voltage electric source circuit 20a and a low voltage electric source circuit 20b.

The high voltage electric source circuit 20a is substantially similar to an electric source circuit used with an ordinary spark ignition plug, and comprises a cam 21 rotatable in synchronism with the engine rotation, a contact arm 22 and a set of contacts 22a, an ignition coil 23, and an electric source 24.

The low voltage electric source circuit 20b is connected via a steering diode 29 to the central electrode 1, and arranged such that a coil 25 and a condenser or capacitor 26 are connected in series, and a series-circuit including a resistor 27 and an electric source 28 is connected in parallel with the condenser 26.

With this construction, when the contact arm 22 is actuated by the cam 21 rotatable synchronously with the engine rotation to open the set of contacts 22a, a primary electric current passing through a primary coil 23a of the ignition coil 23 is cut off, inducing high voltage across a secondary coil 23b, producing a spark in the discharge cavity 4 between the central electrode 1 and the peripheral electrode 2. Then, the electric insulation of the discharge cavity 4 is broken down, providing a state wherein a spark can be produced with a relatively low voltage, so that a discharge of the spark can continue with a relatively low direct electric current supplied from the low voltage electric source circuit 20b. In other words, the electric charge which has been charged to the condenser 26 via the resistor 27 from the electric source 28 is discharged to the discharge cavity 4 via the steering diode 29 and the coil 25, thus maintaining the discharge of spark as long as the electric charge is being discharged.

However, such a plasma jet ignition plug has the previously mentioned problem that electromagnetic wave noise occurring upon spark discharge is so strong that it disturbs television broadcasting service, radio broadcasting service and other kinds of radio communication systems. Further, the noise also causes operational errors in electronically controlled circuits used as vehicle control systems, such as, electronically controlled fuel injection system or electronically controlled skid control system, and, as a result, traffic safety will be threatened.

DESCRIPTION OF PREFERRED EMBODIMENTS

The present invention will be hereinafter described in connection with FIGS. 2(A) to FIGS. 11(C) of the drawings.

Referring to FIGS. 2(A) to 4, a first embodiment of a plasma jet ignition plug according to the present invention is described. This plasma jet ignition plug is substantially the same in construction as that illustrated in FIG. 1 except that a central electrode 1 is made of a material selected from a group consisting of ferrite, a nickel alloy that contains at least one of silicon, aluminum and magnesium, and electrically conductive ceramic.

Where the nickel alloy is selected as the material, it is preferable that the silicon content is 3 to 7%, where the nickel alloy contains silicon; the aluminum content is 2 to 10%, where the nickel alloy contains aluminum; the magnesium content is 1 to 15%, where the nickel alloy contains magnesium.

If the content is less than the lower limit of each range mentioned above, the noise suppression effectiveness drops, whereas, if the content is greater than the upper limit of each range, the nickel alloy becomes hardened so that it is difficult to work and a cracking is likely to occur upon exposure to cold heat while in use.

It will be noted that the nickel alloy contains a relatively great amount of silicon or aluminum or magnesium as compared to the fact that the central electrode of the conventional plasma jet ignition plug as illustrated in FIG. 1 contains very little amount of additive, such as manganese or barium or iron.

The reason why the above-mentioned material is selected will be described hereinafter.

Figure 3:
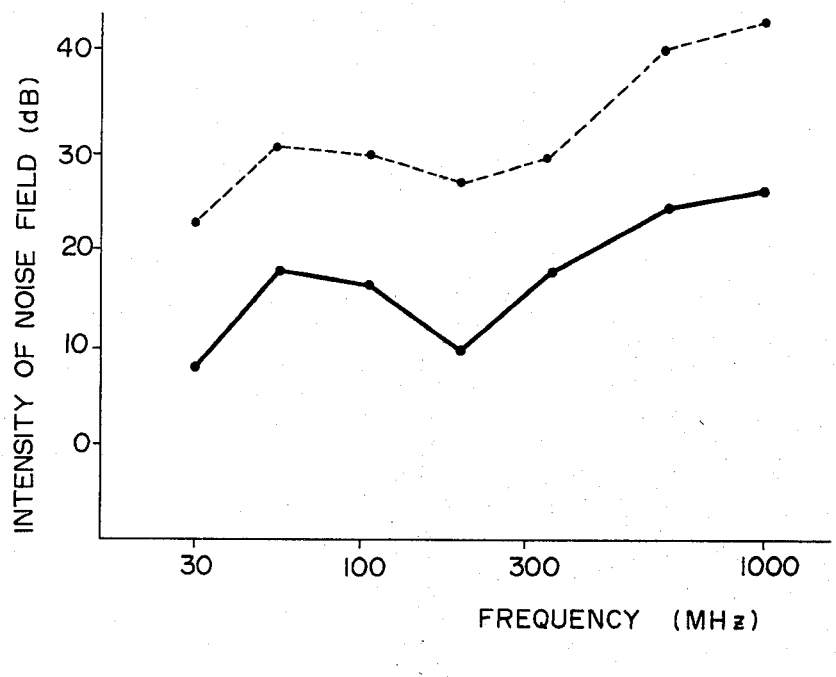
FIG. 3 is a graph showing intensity of noise electric field vs. frequency curves.

The intensity of strength in a noise electric field radiated from a four-cylinder internal combustion engine with a displacement volume of 1,800 cc equipped with plasma jet ignition plugs according to the present invention has been measured against frequency. The result is shown by the solid line in FIG. 3. In FIG. 3, the broken line shows the result obtained by the measurement of the strength in noise electric field radiated from the same engine but equipped with the conventional plasma jet ignition plugs as described in connection with FIG. 1. The scale of the axis of ordinates is proportioned in terms of 1 $\mu V/m = 0dB$.

As will now be appreciated from FIG. 3, the present invention provides a reduction in noise electric field by approximately 20 dB.

The inventors have tried to find a thoretical reason why a remarkable reduction in discharge voltage and discharge current has been accomplished. The following description proceeds in connection with FIG. 7.

Considering the case where ferrite is used, the reason is that ferrite is a burnt combined body of electrically insulating materials and electrically conductive particles. In this case, ions accumulate on the electrically insulating portions within a discharge surface of an electrode. This strengthens the emission of electrons and ionization between the electrodes. As a result, a reduction in discharge voltage and in discharge current is accomplished.

Considering the case where nickel alloy that contains silicon or aluminum or magnesium is used, the reason is that $SiO_2$ or $Al_2O_2$ or $MgO$ appears on the surface of an electrode. This causes the accumulation of ions on the electrically insulating portions within a discharge surface of an electrode. This increases the emission of electrons and ionization between the electrodes. As a result, a reduction in discharge voltage and in discharge current is accomplished.

Figures 5A, 5B:
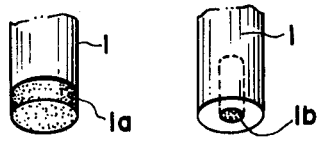
FIGS. 5(A) and 5(B) are fragmentary perspective views of modifications of a central electrode used in a plasma jet ignition plug illustrated in FIG. 4.

Referring to FIGS. 5(A) and 5(B), alternative variations or modifications, in construction, of a central electrode are illustrated. In FIG. 5(A), a free end portion 1a of a central electrode 1 is made of said material, and in FIG. 5(B), a central portion 1b of a free end portion of a central electrode 1 is made of said material.

Figure 6:
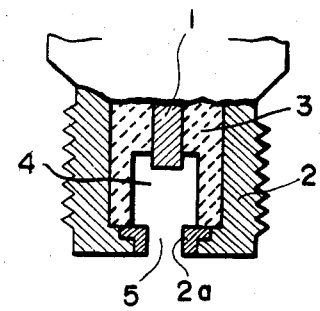
FIG. 6 is a fragmentary sectional view of a second embodiment of a plasma jet ignition plug.
Figure 7:
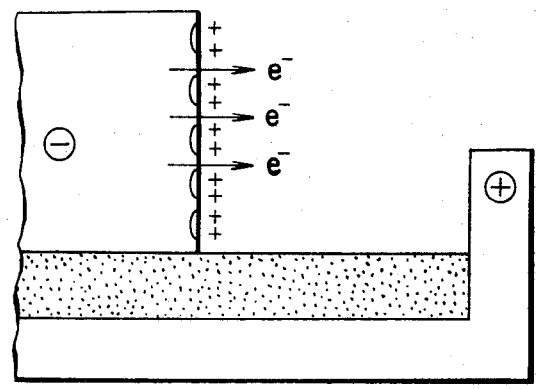
FIG. 7 is an explanatory illustration of the principal underlying the invention.

Another alternative is shown in FIG. 6 wherein a jet opening defining portion 2a of a peripheral electrode is made of said material.

Figure 4:
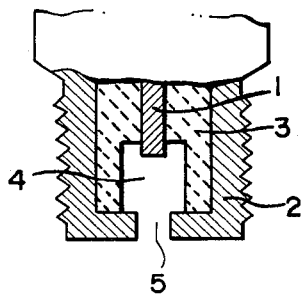
FIG. 4 is a fragmentary sectional view of a first embodiment of a plasma jet ignition plug according to the present invention.

In each of the cases illustrated in FIGS. 5(A), 5(B) and 6, the same effect as that obtained with the embodiment in FIG. 4 has been obtained.

Figure 8A:
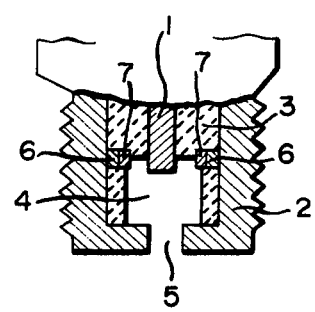
FIG. 8(A) is a fragmentary sectional view of a third embodiment of a plasma jet ignition plug.
Figure 8B:
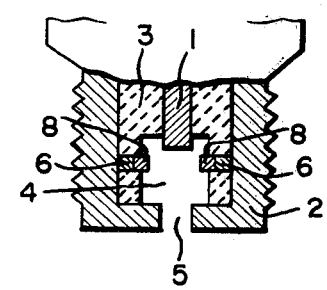
FIG. 8(B) is a similar view to FIG. 8(A) illustrating a fourth embodiment of a plasma jet ignition plug.

Referring to FIG. 8(A), a third embodiment is described wherein the invention is embodied in a plasma jet ignition plug provided with a third electrode 7, while, FIG. 8(B) illustrates a fourth embodiment wherein the invention is embodied in a plasma jet ignition plug provided with an intermediate electrode 8.

The third electrode 7 is connected to a second electrode 2 via a resistor 6 having a high resistivity (see FIG. 8(A)). The intermediate electrode 8 is connected to a second electrode 2 via a resistor 6 having a high resistivity (see FIG. 8(B)).

The constructions of the plasma jet ignition plugs as illustrated in FIGS. 8(A) and 8(B) are conventional. According to the present invention, the third electrode 7 and the intermediate electrode 8 are made of a material selected from a group consisting of ferrite, a nickel alloy containing at least one of silicon, aluminum and magnesium and electrically conductive ceramic.

Figures 2A, 2B:
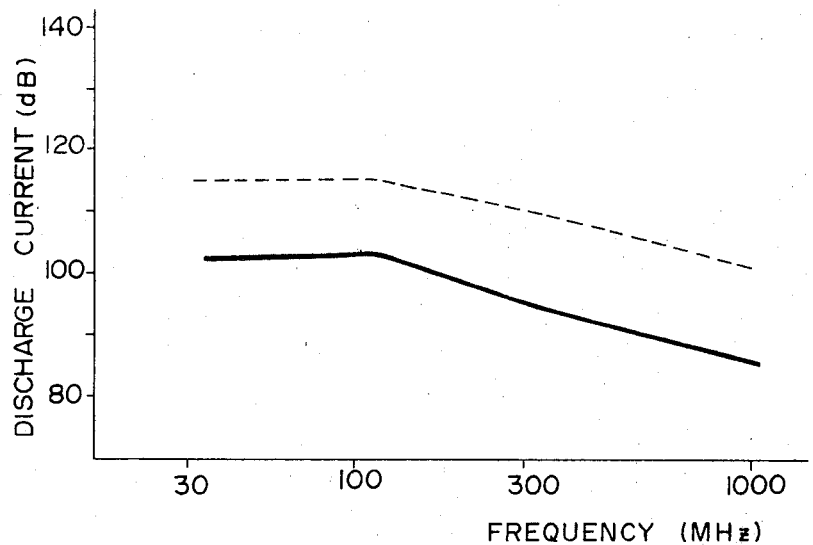
FIG. 2(A) is a graph showing discharge current vs. frequency curves.
FIG. 2(B) is a table listing the discharge voltage for several plasma jet plugs.

Substantially the same result has been obtained with the plasma jet ignition plug shown in FIG. 8(A) or 8(B) as to discharge current vs. frequency (see FIG. 2(A)) and noise electric field vs. frequency (FIG. 3).

Thus, a reduction in approximately 20dB has been accomplished also according to the embodiments in FIGS. 8(A) and 8(B).

Although in both of the embodiments in FIGS. 8(A) and 8(B), the third electrode 7 and intermediate electrode 8 are made of said material only. It is also possible that only part of such an electrode 7 or 8 which communicates with the discharge cavity is made of said material.

Where electrically conductive ceramic is used, it has been confirmed that an electrode which is made of the electrically conductive ceramic is prevented from melting. This is because the electrically conductive ceramic is heat resistive.

Referring to FIGS. 9, 9(A) and 9(B), there is shown a fifth embodiment wherein that end portion 1a of a central electrode 1 which communicates with a discharge cavity 4 and a jet opening defining edge portion 2a of a peripheral electrode 2 are made of electrically conductive ceramic. As best shown in FIG. 9(A), a rod-shaped auxiliary electrode 1a made of electrically conductive ceramic is integrated with the central electrode 1 by sintering to define the end portion communicating with the discharge cavity 4.

The other suitable heat resistive materials are electrically conductive cermet, tungsten and tungsten alloy, that is, a sintered alloy of tungsten and another metal.

One example of such an electrically conductive ceramic is an article formed by a reaction hot press method from a main material which contains approximately 50% of $B_N$ and 50% of $TiB_2$. The resistivity provided by this material is low and of the degree of 200 $\mu$=-cm, and thus the maximum allowable temperature with this material is 2,000° C., so that the melting point temperature of this material is remakably high as compared to those of the conventional materials. Examples of the tungsten alloy as a material are sintered alloy of a tungsten and a silver and a sintered alloy of tungsten and a copper. They are formed by having tungsten powder mixed, under pressure, with silver powder or copper powder, and then having the same heated, and this article is easy to work.

Referring to FIGS. 10(A), (B) and (C), modifications of a central electrode are illustrated. FIG. 10(A) illustrates a rod-shaped auxiliary electrode 1a which has a reduced diameter portion 1c interposed in a slit 1b with which a central electrode 1A is formed.

FIG. 10(B) illustrates a rod-shaped auxiliary electrode 1a having a tapered end 1d adapted to insert into a bore with which a central electrode 1B is formed and fixed to the same by pins 1e.

FIG. 10(C) illustrates a rod-shaped auxiliary electrode 1a having a male threaded portion 1f adapted to engage in a tapped bore 1g with which a central electrode 1C is formed.

These auxiliary electrodes 1a are made of a material selected from a group consisting of ferrite, a nickel alloy which contains at least one of silicon, aluminum and magnesium and electrically conductive ceramic or such a heat resistive material as electrically conductive cermet or tungsten or tungsten alloy.

Referring to FIGS. 11(A) and 11(B), modifications of a peripheral electrode 2 are illustrated, wherein FIG. 11(A) illustrates a cylindrical auxiliary electrode 2a with inward opposed projections 2b, 2b, and FIG. 11(B) illustrates two auxiliary electrodes in the form of a projection 2c, 2c embedded into a peripheral electrode in such a manner as to expose to a jet opening 5.

These auxiliary electrodes 2a, 2b, 2c are made of a material selected from a group consisting of ferrite, a nickel alloy which contains at least one of silicon, aluminum and magnesium, and electrically conductive ceramic, or such a heat resistive material as electrically conductive cermet or tungsten or tungsten alloy.

What is claimed is:

1. A plasma jet ignition plug comprising:
   an electric insulator formed with a discharge cavity; and
   a plurality of electrodes communicating with said discharge cavity to form, within said discharge cavity, a spark gap;
   said plurality of electrodes including a central electrode connected to a high voltage electric source circuit and a low voltage electric source circuit, and a peripheral electrode connected to the ground, said peripheral electrode substantially closing said discharge cavity and being formed with a jet opening, and
   wherein at least a portion of at least one of said plurality of electrodes is made from ferrite.

2. A plasma jet ignition plug comprising:
   an electric insulator formed with a discharge cavity; and
   a plurality of electrodes communicating with said discharge cavity to form, within said discharge cavity, a spark gap;
   said plurality of electrodes including a central electrode connected to a high voltage electric source circuit and a low voltage electric source circuit, and a peripheral electrode connected to the ground, said peripheral electrode substantially closing said discharge cavity and being formed with a jet opening; and
   wherein at least a portion of at least one of said plurality of electrodes is made from a nickel alloy containing more than one of a group consisting of silicon in the range of 3 to 7 percent; aluminum in the range of 2 to 10 percent; and magnesium in the range of 1 to 15 percent.

* * * * *